United States Patent Office 3,513,083
Patented May 19, 1970

3,513,083
PROCESS FOR THE ELECTROPHORETIC PREPARATION OF CORROSION RESISTANT COATINGS
Robert Vitek, Mariaenzersdorf, Austria, assignor, by mesne assignments, to Stollack Aktiengesellschaft, Guntramsdorf, near Vienna, Austria, a corporation of Austria
No Drawing. Filed June 27, 1967, Ser. No. 649,129
Int. Cl. C23b *13/00;* B01k *5/02*
U.S. Cl. 204—181       8 Claims

ABSTRACT OF THE DISCLOSURE

Aqueous electrophoretic baths comprised of pigments, water-soluble resins of polyester resins and formaldehyde condensation resins and small amounts of a silicone-resin and method of forming high corrosion resistant coatings with said electrophoretic baths and coatings produced thereby.

Prior art

Known coatings precipitated by electrophoresis from water-soluble resins of polyester resins and formaldehyde resins in the presence of pigments and water and subsequently baked on the surfaces show a relatively low corrosion resistance. In the cases where for instance on road vehicles only primings of the chassis were effected, particularly on the bottom parts of motor vehicles facing the road surface, these coatings show a particular tendency to be affected by the salt spread across the roads to prevent the formation of ice. If these coatings are subjected to the salt-spray test of ASTM, the protective action of the coating is lost after only 100 hours. After this period of time, the undesired corrosion will already be apparent in the form of rust formation and superficial damage.

Objects of the invention

It is an object of the invention to provide extremely high corrosion resistant coating by electrophoresis using water-soluble resins.

It is another object of the invention to provide novel electrophoretic baths for forming high corrosion resistant coatings.

It is a further object of the invention to provide a novel electrophoretic process for the formation of high corrosion resistant coatings.

These and other objects and advantages of the invention will become obvious from the following detailed description.

The invention

The novel process of the invention for forming high corrosion resistant coatings comprises passing an electric current through an aqueous bath having a pH of 7.2 to 7.6 and containing 1 to 20%, preferably 5 to 15%, by weight of a water-soluble, heat-hardenable combination of a polyester resin and a formaldehyde resin selected from the group consisting of urea-formaldehyde condensation product, melamine-formaldehyde condensation product and phenol-formaldehyde condensation product, pigments and 0.5 to 5%, preferably 2 to 3%, of a silicone resin to deposit a coating on the article to be coated and baking the resulting coated article.

Coatings prepared on test sheets according to these methods produced very satisfactory results in the salt-spray of ASTM. After 270 hours in the said test, no corrosion phenomenon were detected so that the corrosion resistance of the coatings of the invention is 2.5 to 3 times that of coatings prepared in the known electrophoretic method.

The substantial increase in corrosion resistance is based on the fact that silicone resins make the synthetic lacquer resins hydrophobic. The amounts of silicone resin added to the electrophoretic bath are not quantatively separated, but are only carried along in part by the polyester resin-resin mixture and they remain in the synthetic resin layer. Therefore, depending upon the type of the resin mixture used, certain minimum amounts of silicone resin have to be added so that the amount required to obtain the optimum corrosion resistance can be deposited therein. Care has to be taken that the pH value is held within the limits between 7.2 and 7.6. The conductivity of the electrophoretic bath should be adjusted to 1400 to 1600 $\mu$s. at a temperature between 25–35° C. At DC voltage of 80–120 volts and by observing the indicated physical limit values, the extremely high corrosion resistant coating is separated uniformly within 1–2 minutes.

The water-soluble mixture of unsaturated polyesters and formaldehyde resin mixtures may be physical mixtures or chemically reacted mixtures and are well known. They have been described in Austrian Pat. No. 180,407, No. 198,858 and No. 204,150 and are sold under the trademark Resydrole. The said resins are unlimited dilutable with distilled, softened and de-ionized water, extensively dilutable with water-miscible solvents and limitedly dilutable with high molecular weight alcohols, esters and ketones. A 20% aqueous solution of the said resins has a pH of 6.5 to 8. The resins are in the form of salts prepared by neutralizing the resin with an inorganic or organic nitrogen base.

The said resin mixtures are comprised of addition products of unsaturated fatty acids or their esters or mixed esters of the said fatty acids and resins acids with ethylenically unsaturated carboxylic acids and/or unhardenable polyhydroxyl compounds and formaldehyde resin selected from the group consisting of urea-formaldehyde condensates, melamine-formaldehyde condensates, phenol-formaldehyde condensates and derivatives or homologs thereof.

The silicone resin may be added to the aqueous bath as an emulsion thereof, as a silicone-modified formaldehyde resin selected from the group consisting of formaldehyde-urea condensates, formaldehyde-melamine condensates and formaldehyde-urea condensates or a mixture of the two. Silicone resins are well known and sold under various trademarks such as silicone oil Bayer A and Silicone Resin CL 1E and CL 3 (based on phenylmethylpolysiloxanes). The silicone-modified formaldehyde resins are obtained by heating a mixture of a silicone resin and the formaldehyde resin with or without the addition of catalysts.

If silicon-modified formaldehyde resins are used in the electrophoresis bath, it will have to be ascertained for the obtention of an optimum effect if the silicone-modified formaldehyde resins to be added to the electrophoretic bath or if silicone-modified formaldehyde resins are to be used exclusively in place of the water-soluble formaldehyde resin. However, it is also possible to combine the two processes and to add a silicone resin emulsion as well as silicone modified formaldehyde resins to a normal electrophoretic bath consisting of water soluble polyesters in formaldehyde resin, pigments and water, in which case the silicone content is to be kept within the limits of 0.1 to 5%, preferably 2 to 3% to obtain the optimum effect. A higher content of silicone not only does not produce any greater corrosion resistance, but it adversely influences the electrophoretic separation.

Examples of suitable pigments which can be used in the bath are titanium dioxide, carbon black, red iron oxide, mica dust, mica slate, chalk, graphite, powdered asbestos, talc, etc. The aqueous baths usually contain 20 to 50% of pigment based on the weight of the resin content.

In the following examples, there are described several preferred embodiments to illustrate the invention. However, it should be understood that the invention is not intended to be limited to the specific embodiments.

Example I

An electrophoresis bath consisting of 7% by weight of Resydrol M 501 (a water-dilutable, heat hardenable melamine-phenol resin admixed with polyester), 3% by weight of red ferrous oxide, 2% by weight of Silicone Oil Bayer A having a viscosity at 20° C. of 10–30 cst. and 88% by weight of water having a conductivity maximum of 80 $\mu$s. was used to form a coating on a test metal strip. A current of 80 to 100 volts was passed through the bath for 30 to 60 seconds. The resulting strip was then baked at 150 to 170° C. for 20 to 30 minutes. In the salt-spray ASTM test, no corrosion was evident on the strip after 270 hours.

Example II

A 50% aqueous solution of a resin consisting of melamine-formaldehyde condensate and esters of ethylene glycol and a mixture of unsaturated fatty acids and resin acids and trimethylamine to which 1% of phthalic acid anhydride had been added as a catalyst was heated to reflux with stirring. Then sufficient silicon resin solution Cl 1E (a mixed condensate of phenylmethylpolysiloxane and a high molecular weight resin), was added thereto until the reaction solution contained 10% of the silicone resin. The reaction solution was then refluxed for one hour to complete the polymerization.

8 parts by weight of the said resin, 2.5 parts by weight of titanium dioxide, 0.5 part by weight of carbon black and 89 parts by weight of water having a conductivity maximum of 80 $\mu$s. were admixed to form an electrophoresis bath which was used to form coatings using the procedure of Example I. No evidence of corrosion was evident on the metal strip after 270 hours in the salt-spray test.

Example III

A 40% aqueous solution of Resydrol A 410 (a mixture of polyester resin and phenol-formaldehyde condensate reacted with ammonia), was heated to 120° C. in a closed vessel with vigorous stirring. Then Bayer Silicone Oil A was slowly added thereto with continued stirring until the reaction solution contained 12% by weight of the silicone resin. The reaction solution was then heated in the closed vessel for 2 hours at 120° C. with stirring and then was cooled with stirring. The resulting resin was then used to form an electrophoresis bath as in Example I and excellent coatings were obtained therefrom.

Various modifications of the method and baths of the invention may be made without departing from the spirit or scope thereof and it is to be understood that the invention is to be limited only as defined in the appended claims.

I claim:

1. A process for the preparation of extremely high corrosion resistant coatings which comprises passing an electric current through an aqueous electrophoresis bath comprising pigments, 1 to 20% by weight of at least one water-soluble resin mixture of a polyester resin and a formaldehyde resin selected from the group consisting of formaldehyde-urea resins, formaldehyde-melamine resins and formaldehyde-phenol resins and 0.5 to 5% by weight of a silicone resin to form a coating on an article to be coated and baking the resulting coated article at elevated temperatures.

2. The process of claim 1 wherein the amount of silicone resin is 2 to 3% by weight of the bath.

3. The process of claim 1 wherein the silicone resin is added in the form of an emulsion.

4. The process of claim 1 wherein the pH of the electrophoresis bath is 7.2 to 7.6.

5. The process of claim 1 wherein the silicone resin is added in the form of a silicone-modified formaldehyde resin.

6. The process of claim 1 wherein the electric conductivity of the bath is 1400 to 1600 $\mu$s. at 25 to 35° C.

7. The process of claim 1 wherein the electric current is applied at 80 to 120 volts.

8. An article having an extremely high corrosion resistant coating formed thereon by the process of claim 1.

References Cited

UNITED STATES PATENTS

| | | | |
|---|---|---|---|
| 2,478,322 | 8/1949 | Robinson et al. | 204—181 |
| 2,865,795 | 12/1958 | Morrison | 204—181 |

HOWARD S. WILLIAMS, Primary Examiner